Patented June 17, 1952

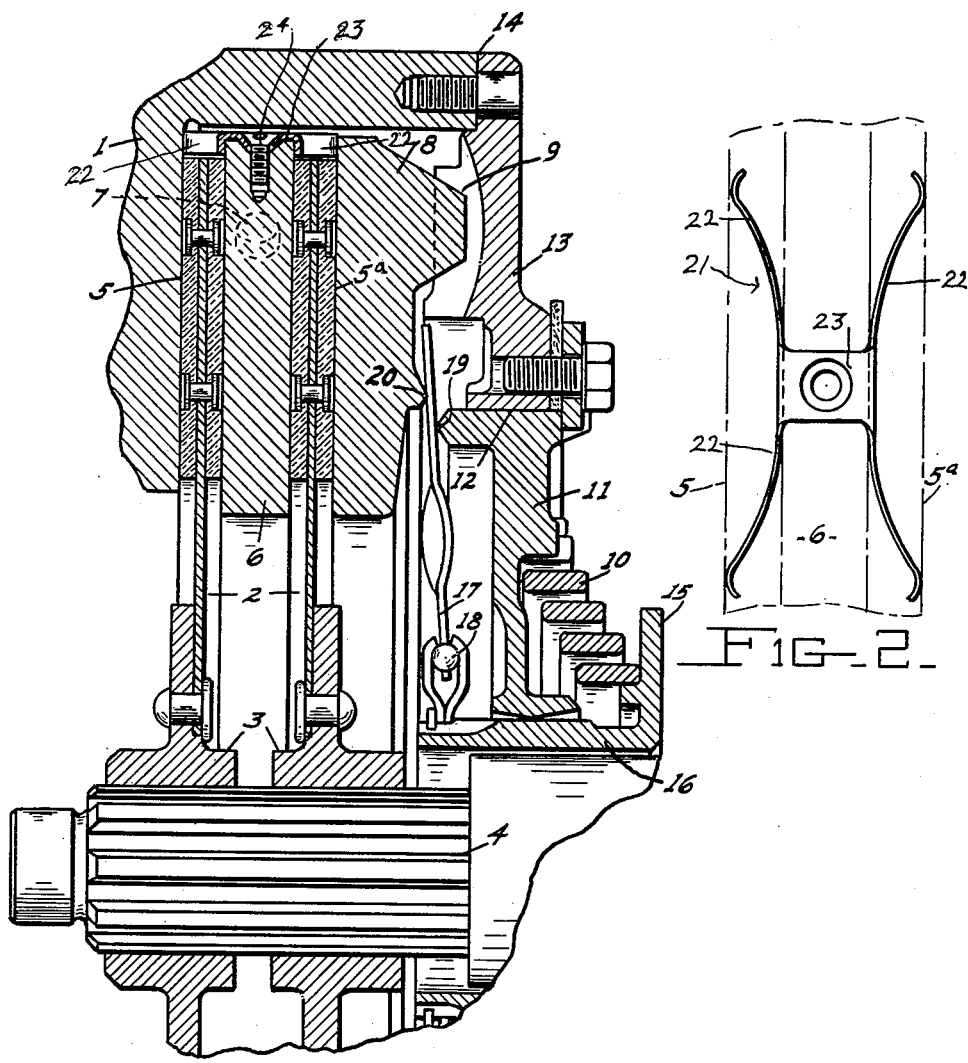

2,600,520

UNITED STATES PATENT OFFICE 2,600,520

FRICTION DISK SEPARATOR FOR DOUBLE DISK CLUTCHES

Charles B. Spase, Nedrow, N. Y., assignor to Line-Rollway Corporation, Syracuse, N. Y., a corporation of New York Application October 16, 1948, Serial No. 54,990

1 Claim. (Cl. 192—69)

This invention relates to double disk clutches and has for its object spring means for separating the friction members of the clutch when the clutch is thrown out or released by the throw-out mechanism.

More particularly, it has for its object springs rigidly secured to an intermediate friction member of the clutch at the periphery thereof and having leaf spring arms on opposite sides of the intermediate member and interposed between opposite side faces thereof, and the friction faces of other axially shiftable clutch members so that when the clutch is engaged, the springs are compressed, and when the clutch is released the springs react axially and separate the engaged friction members of the clutch from each other.

The invention consists in the novel features and in the combinations and constructions hereinafter set forth and claimed.

In describing this invention, reference is had to the accompanying drawing in which like characters designate corresponding parts in all the views.

Figure 1 is a fragmentary longitudinal sectional view of a clutch embodying this invention.

Figure 2 is a fragmentary view of the springs and the member on which they are mounted.

The springs are here shown as embodied in a double disk clutch including a driving element 1, which is usually rotatable with the engine shaft and may be the fly wheel of the engine, and a driven element consisting of a pair of friction disks 2 having their hubs 3 slidably splined on the clutch shaft 4. The driving element is formed with the usual cylindrical recess in which the clutch friction members are located, the bottom 5 of the recess being a friction face with which one of the disks 2 coacts. The driving element 1 also comprises an intermediate member 6 rotatable therewith and shiftable axially, it being connected to the driving element by lugs 7. It also comprises a pressure member 8 splined at its periphery at 9 thereto, so as to be shiftable axially. The pressure member 8 is, in the clutch here shown, pressed into engaged position by a spring 10 thrusting in opposite directions against a fulcrum plate 11 slidably mounted at 12 in a back plate 13 secured at its rim at 14 to the driving element 1, the spring thrusting in the other direction against a collar 15 on a throw-out sleeve 16 shiftable axially of the clutch shaft 4, the motion thereof being transmitted to the pressure member 8 through levers 17 anchored or pivoted at 18 to the inner end of the throw-out collar, coacting between their ends with an annular fulcrum 19 on the fulcrum plate 11 and pressing on an annular fulcrum 20 on the outer side of the pressure ring 8. The throw-out sleeve 16 is operated by the clutch pedal. The type of clutch and operating mechanism per se forms no part of this invention.

The invention relates to springs for separating the members 1, 2, 6 and 8 when the throw-out pedal is operated to release the clutch, the springs 21 being shown as formed in pairs fixedly secured to the periphery of the intermediate member 6 and interposed between the opposite side faces of the rim of the member 6 and the opposing faces 5 and 5ª of the driving element 1 and the pressure member 8, respectively, the intermediate member 6 extending beyond the peripheries of the disks 2, thereby providing spaces in which the springs are located. The springs are leaf springs and preferably bow springs connected together at the apex of the bow formation, the outer ends of the leaf springs slidably engaging the faces 5 and 5ª.

There is a plurality, usually three sets of springs spaced apart about the periphery of the intermediate member 6, and the springs are H-shaped in general form, with the legs 22 of the H-formation constituting bow springs, and the bar 23 of the H-formation extending across the periphery of the member 6 and rigidly secured thereto at 24.

In operation, when the clutch is engaged, the springs are compressed equally, and when the clutch is released, the pressure member 8 is in effect released first and the bow spring coacting therewith reacts and separates from the disk 2, freeing the disk 2. The release of this one bow spring permits the other bow spring to react instantly and separate from the disk 2, relieving its pressure against the friction face 5. Theoretically, the two springs would act simultaneously, but actually one spring acts slightly in advance of the other and, due to the fact that the springs are rigidly mounted on the intermediate member 6 and hence, their reaction coupled together, the clutch is completely released without drag, compared with pivoted devices for separating the clutch members and other spring devices which are not rigidly secured to the intermediate member.

What I claim is:

A double disk friction clutch comprising drive and driven elements, the driven element comprising axially shiftable spaced disks, one disk coacting with the drive element and the drive element comprising an intermediate axially shiftable disk between the disks of the driven element and an axially shiftable pressure member coacting with the other disk of the driven element, means acting on the pressure member to engage and release the clutch, and compression springs interposed between the side faces of the rim of the intermediate disk and the opposing faces of the driving element and the pressure ring respectively, each of the springs being double bow springs interposed between opposing faces of the intermediate disk and the driving element and the pressure member, the springs having an intermediate portion connecting the apex portions of the bow formations and overlying and secured to the periphery of the intermediate member.

CHARLES B. SPASE.

REFERENCES CITED

The following references are of record in the file of this patent:

UNITED STATES PATENTS

| Number | Name | Date |
|---|---|---|
| 511,047 | Gamron | Dec. 19, 1893 |
| 1,717,534 | Wemp | June 18, 1929 |
| 1,745,033 | Smith | Jan. 28, 1930 |
| 2,036,005 | Wemp | Mar. 31, 1936 |
| 2,257,877 | Binder | Oct. 7, 1941 |
| 2,280,357 | Spase | Apr. 21, 1942 |
| 2,379,024 | Thelander | June 26, 1943 |

FOREIGN PATENTS

| Number | Country | Date |
|---|---|---|
| 360,695 | Italy | July 4, 1938 |